US008670049B2

(12) United States Patent
Ono et al.

(10) Patent No.: US 8,670,049 B2
(45) Date of Patent: Mar. 11, 2014

(54) PHOTOELECTRIC CONVERSION DEVICE AND IMAGE CAPTURING DEVICE

(75) Inventors: Toshiaki Ono, Ebina (JP); Toru Koizumi, Yokohama (JP); Tetsuya Itano, Zama (JP)

(73) Assignee: Canon Kabushiki Kaisha, Tokyo (JP)

( * ) Notice: Subject to any disclaimer, the term of this patent is extended or adjusted under 35 U.S.C. 154(b) by 19 days.

(21) Appl. No.: 13/326,731

(22) Filed: Dec. 15, 2011

(65) Prior Publication Data

US 2012/0086841 A1 Apr. 12, 2012

Related U.S. Application Data

(63) Continuation of application No. 11/833,170, filed on Aug. 2, 2007, now Pat. No. 8,085,319.

(30) Foreign Application Priority Data

Aug. 8, 2006 (JP) ................................. 2006-216220

(51) Int. Cl.
*H04N 5/217* (2011.01)
*H04N 5/335* (2011.01)

(52) U.S. Cl.
USPC ........................................ 348/241; 348/308

(58) Field of Classification Search
USPC .................... 348/241, 301, 308, 300, 294; 250/208.1; 327/94, 96
See application file for complete search history.

(56) References Cited

U.S. PATENT DOCUMENTS

| | | | |
|---|---|---|---|
| 5,698,892 A | 12/1997 | Koizumi et al. | 257/620 |
| 6,188,094 B1 | 2/2001 | Kochi et al. | 257/232 |
| 6,605,850 B1 | 8/2003 | Kochi et al. | 257/431 |
| 6,670,990 B1 | 12/2003 | Kochi et al. | 348/310 |
| 6,674,471 B1 | 1/2004 | Masuyama | 348/312 |
| 6,753,913 B1 * | 6/2004 | Bilhan et al. | 348/241 |
| 6,791,607 B1 | 9/2004 | Bilhan et al. | 348/243 |
| 6,946,637 B2 | 9/2005 | Kochi et al. | 250/208.1 |
| 6,960,751 B2 | 11/2005 | Hiyama et al. | 250/208.1 |
| 6,963,367 B1 | 11/2005 | Hashimoto | 348/241 |
| 7,016,089 B2 | 3/2006 | Yoneda et al. | 358/482 |
| 7,110,030 B1 | 9/2006 | Kochi et al. | 348/308 |
| 7,126,102 B2 | 10/2006 | Inoue et al. | 250/214 |
| 7,227,208 B2 | 6/2007 | Ogura et al. | 257/292 |
| 7,321,110 B2 | 1/2008 | Okita et al. | 250/208.1 |
| 7,324,144 B1 | 1/2008 | Koizumi | 348/294 |
| 7,394,491 B2 | 7/2008 | Bae et al. | 348/241 |

(Continued)

FOREIGN PATENT DOCUMENTS

JP 11-355664 A 12/1999
JP 2000-287131 A 10/2000

(Continued)

*Primary Examiner* — Aung S Moe
(74) *Attorney, Agent, or Firm* — Fitzpatrick, Cella, Harper & Scinto

(57) ABSTRACT

A photoelectric conversion device includes a pixel unit including a photoelectric converter, an amplifier arranged on the output side of the pixel unit, an output unit arranged on the output side of the amplifier, a first restriction circuit, and a second restriction circuit. The first restriction circuit restricts, between the amplifier and the output unit, a noise level read out from the pixel unit via the amplifier in reading out the noise level from the pixel unit. The second restriction circuit restricts, between the photoelectric converter and the amplifier, a noise level to be provided to the amplifier in reading out the noise level from the pixel unit.

7 Claims, 13 Drawing Sheets

(56) References Cited

U.S. PATENT DOCUMENTS

| | | |
|---|---|---|
| 7,397,505 B2 | 7/2008 | Brehmer et al. ............... 348/243 |
| 7,626,622 B2 | 12/2009 | Kasuga et al. ................. 348/300 |
| 7,646,412 B2 | 1/2010 | Hisamatsu et al. ........... 348/257 |
| 8,068,155 B2 * | 11/2011 | Muroshima et al. .......... 348/294 |
| 2002/0118127 A1 | 8/2002 | Ahn et al. ...................... 341/139 |
| 2002/0179712 A1 | 12/2002 | Yahagi et al. ................. 235/454 |
| 2003/0011831 A1 * | 1/2003 | Sakurai et al. ................ 358/513 |
| 2003/0146993 A1 | 8/2003 | Kokubun et al. .............. 348/308 |
| 2003/0164887 A1 | 9/2003 | Koizumi et al. ............... 348/308 |
| 2004/0239786 A1 * | 12/2004 | Masuyama et al. ........... 348/294 |
| 2005/0185074 A1 | 8/2005 | Yoneda et al. ................. 348/294 |
| 2005/0268960 A1 | 12/2005 | Hiyama et al. ................ 136/244 |
| 2005/0269604 A1 | 12/2005 | Koizumi et al. ............... 257/291 |
| 2005/0285958 A1 * | 12/2005 | Matsuda ........................ 348/300 |
| 2006/0043439 A1 | 3/2006 | Koizumi ........................ 257/291 |
| 2006/0157759 A1 | 7/2006 | Okita et al. ................... 257/292 |
| 2006/0158539 A1 | 7/2006 | Koizumi et al. .............. 348/300 |
| 2006/0158543 A1 | 7/2006 | Ueno et al. .................... 348/308 |
| 2006/0192864 A1 | 8/2006 | Mauritzson ................... 348/241 |
| 2006/0208291 A1 | 9/2006 | Koizumi et al. ............... 257/292 |
| 2006/0208292 A1 | 9/2006 | Itano et al. .................... 257/292 |
| 2006/0221667 A1 | 10/2006 | Ogura et al. .................. 365/149 |
| 2007/0018080 A1 | 1/2007 | Inoue et al. .................... 250/214 |
| 2007/0262367 A1 | 11/2007 | Koizumi ........................ 257/292 |
| 2008/0029689 A1 | 2/2008 | Kobayashi et al. ......... 250/208.1 |
| 2008/0029793 A1 | 2/2008 | Watanabe et al. ............. 257/291 |
| 2008/0030612 A1 | 2/2008 | Itano et al. .................... 348/340 |
| 2008/0036890 A1 | 2/2008 | Yamashita et al. ............ 348/308 |
| 2008/0143863 A1 * | 6/2008 | Masuyama et al. ........... 348/308 |
| 2009/0256936 A1 * | 10/2009 | Sonoda et al. ................. 348/294 |
| 2010/0039543 A1 * | 2/2010 | Muroshima et al. .......... 348/300 |
| 2010/0245642 A1 * | 9/2010 | Toya et al. ..................... 348/300 |
| 2012/0057042 A1 * | 3/2012 | Sato et al. ................... 348/222.1 |

FOREIGN PATENT DOCUMENTS

| | | |
|---|---|---|
| JP | 2001-024949 | 1/2001 |
| JP | 2001-85659 A | 3/2001 |
| JP | 2001-345440 A | 12/2001 |
| JP | 2004-222273 | 8/2004 |

* cited by examiner

F I G. 2
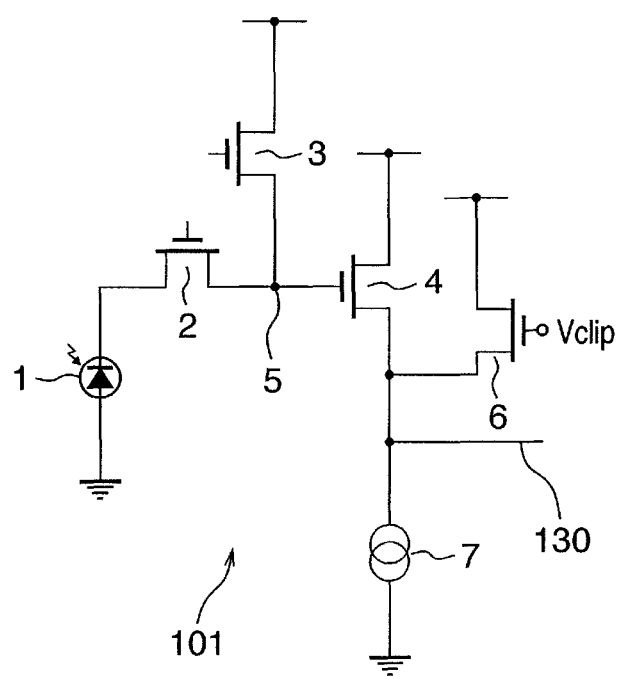

PHOTOELECTRIC CONVERSION DEVICE AND IMAGE CAPTURING DEVICE

This application is a continuation of U.S. patent application Ser. No. 11/833,170, filed Aug. 2, 2007.

BACKGROUND OF THE INVENTION

1. Field of the Invention

The present invention relates to a photoelectric conversion device and image capturing device.

2. Description of the Related Art

Recently, solid-state image capturing devices using amplifier type photoelectric conversion devices, especially MOS photoelectric conversion devices have attracted attention. In the MOS solid-state image capturing device, for example, when the sun falls within the angle of view and very strong light enters the image capturing plane, a portion of the image receiving strong light is captured as a dark portion. This phenomenon is called high-brightness darkening, darkening, or blackening phenomenon. This phenomenon will be referred to as "darkening".

Darkening occurs in a CDS (Correlated Double Sampling) method of reading out an S output (data level) and N output (noise level) from a pixel, calculating their difference, and outputting it. If high-brightness light is incident in reading out an N output, charges generated by light enter the floating diffusion, decreasing the voltage of the floating diffusion. In response to this, an N output from a pixel drops. If the output drops excessively, the difference between the S and N outputs becomes very small, causing darkening.

Japanese Patent Laid-Open No. 2004-222273 discloses an arrangement for reducing darkening. FIG. 2 is a circuit diagram showing the arrangement of a pixel having a function of suppressing darkening. A pixel unit 101 may include a photoelectric converter 1, a transfer gate 2, a charge-voltage converter 5, an amplifying transistor 4, and a reset transistor 3. The photoelectric converter 1 includes, for example, a photodiode and generates charges upon receiving light. The transfer gate 2 transfers charges generated by the photoelectric converter 1 to the charge-voltage converter 5 in accordance with a transfer pulse. In general, the charge-voltage converter 5 may be formed as a floating diffusion. The amount of charges transferred to the charge-voltage converter 5 determines its voltage. The amplifying transistor 4 amplifies the voltage of the charge-voltage converter 5, and outputs the amplified voltage onto a pixel output line 130. The reset transistor 3 resets the voltage of the charge-voltage converter 5 to a predetermined voltage. The source of the reset transistor 3 is connected to the charge-voltage converter 5 and the gate of the amplifying transistor 4. The drain of the reset transistor 3 is set to a predetermined voltage together with that of the amplifying transistor 4.

In reading out the noise level, a clipping transistor 6 receives at its gate the voltage Vclip which determines the clip level. Letting Vt be the threshold of the clipping transistor 6, the voltage of the pixel output line 130 in reading out the noise level is so restricted as to not become lower than Vclip−Vt. Thus, a sufficient difference that is sufficient to cope with an optical signal is obtained between the data level and the noise level, suppressing darkening.

As another method, Japanese Patent Laid-Open No. 2001-024949 discloses an arrangement having a correction means for correcting the differential process between the signal level and the noise level in accordance with an output from an image capturing condition detection means when performing the differential process.

According to the technique as shown in FIG. 2, it is difficult to set the voltage Vclip applied to the gate of the clipping transistor 6. When a normal noise level is output, the clipping transistor 6 must be completely OFF so as to prevent the clipping transistor 6 from affecting the voltage of the pixel output line 130. This is because, if the clipping transistor 6 is ON in reading out the noise level, the noise level varies and no accurate noise level can be subtracted from the data level.

Considering manufacturing variations in the clipping transistor 6, for example, Vclip must be set lower by about 0.2 V than the threshold of the clipping transistor 6 in order to completely turn off the clipping transistor 6. This means that, if the voltage of the pixel output line 130 drops owing to charges flowing into the charge-voltage converter 5, the clipping transistor 6 is not turned on unless the voltage becomes lower by 0.2 V or more than the threshold of the clipping transistor 6.

When the photoelectric converter 1 holds sufficient charges and the voltage appearing on the pixel output line 130 exhibits large amplitude, the fluctuation of about 0.2 V in the reset level is negligibly small.

However, when the sensitivity of the photoelectric converter 1 decreases due to downsizing of the pixel or the quantity of incident light is small in recording a dark object, the amount of charges stored in the photoelectric converter 1 is small, and the voltage appearing on the pixel output line 130 exhibits small amplitude. In this case, the voltage fluctuation of 0.2 V is not negligible.

In this case, the fluctuation of the voltage Vclip must be suppressed within, for example, 0.05. However, since the threshold varies by about 0.1 V owing to manufacturing variations in the clipping transistor 6, suppressing the fluctuation of the voltage Vclip is insignificant.

SUMMARY OF THE INVENTION

The present invention has been made to overcome the conventional drawbacks, and has as its object to provide a technique advantageous to suppressing degradation of the image quality caused by, for example, manufacturing variations in a circuit element.

According to one aspect of the present invention, a photoelectric conversion device comprises a pixel unit which includes a photoelectric converter, an amplifier which is arranged on an output side of the pixel unit, an output unit which is arranged on an output side of the amplifier, a first restriction circuit which restricts, between the amplifier and the output unit, a noise level read out from the pixel unit via the amplifier in reading out the noise level from the pixel unit, and a second restriction circuit which restricts, between the photoelectric converter and the amplifier, a noise level to be provided to the amplifier in reading out the noise level from the pixel unit.

The present invention provides a technique advantageous to suppressing degradation of the image quality caused by, for example, manufacturing variations in a circuit element.

Further features of the present invention will become apparent from the following description of exemplary embodiments with reference to the attached drawings.

BRIEF DESCRIPTION OF THE DRAWINGS

FIG. 2 is a circuit diagram showing the arrangement of a pixel having a function of suppressing darkening;

DESCRIPTION OF THE EMBODIMENTS

A basic arrangement common to photoelectric conversion devices according to the first to sixth embodiments of the present invention will be described first. Then, individual features of photoelectric conversion devices according to the first to sixth embodiments will be explained mainly by their differences from the basic arrangement.

[Basic Arrangement]

Figure 11:
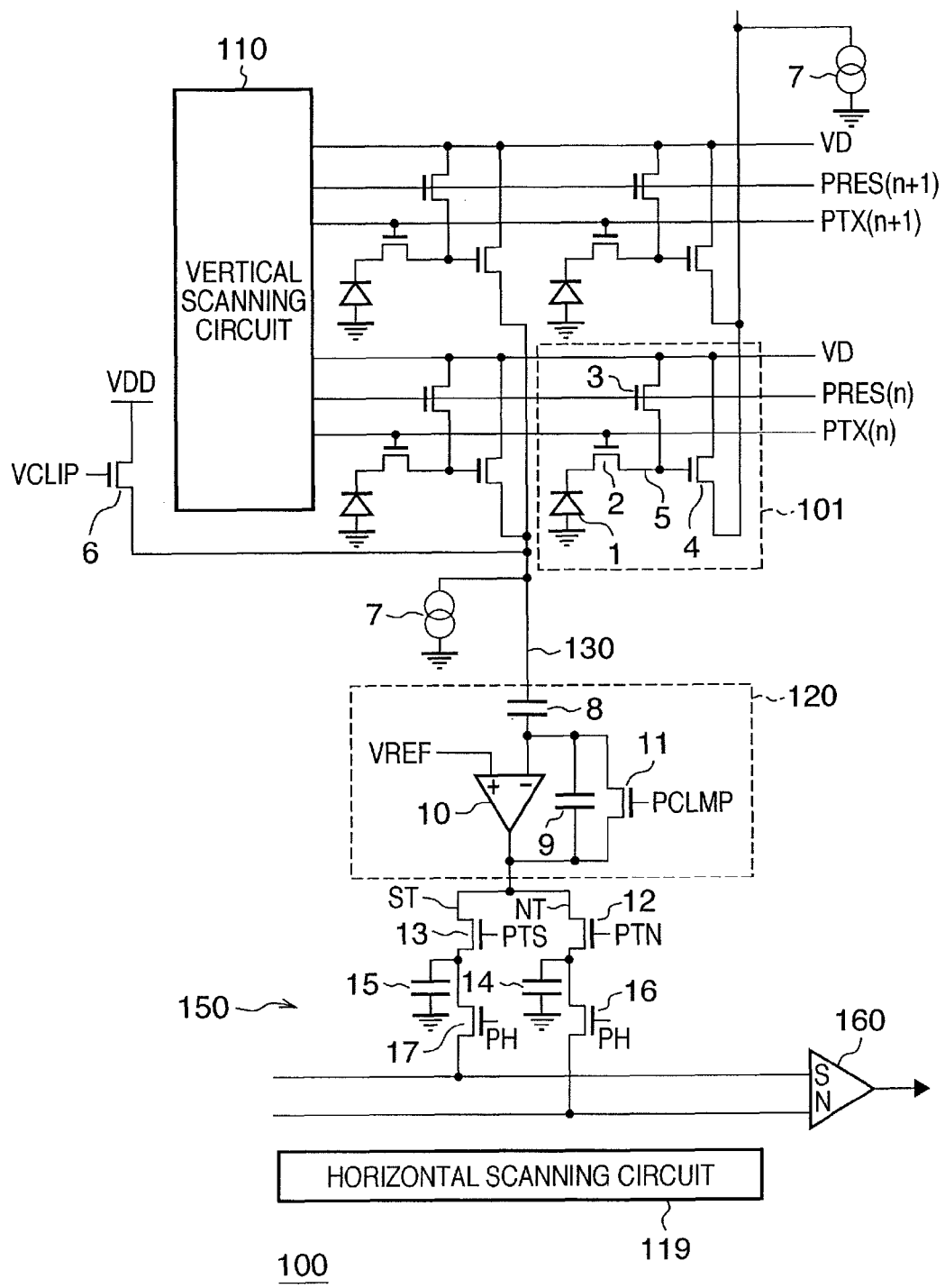
FIG. 11 is a circuit diagram illustrating the basic arrangement of a photoelectric conversion device (solid-state image capturing device) to which the present invention is applicable.

FIG. 11 is a circuit diagram illustrating the basic arrangement of a photoelectric conversion device (solid-state image sensor) to which the present invention is applicable.

A photoelectric conversion device (solid-state image sensor) 100 as shown in FIG. 11 may also be called an amplifier type solid-state image sensor or amplifier type MOS sensor. The photoelectric conversion device 100 has a plurality of pixel units 101 arrayed one- or two-dimensionally. Each pixel unit 101 drives a pixel output line 130 in accordance with incident light. The pixel unit 101 may include, for example, a photoelectric converter 1, a transfer gate 2, a charge-voltage converter (floating diffusion) 5, an amplifying transistor 4, and a reset transistor 3, but is not limited to them. The photoelectric converter 1 includes, for example, a photodiode and generates charges upon receiving light. The transfer gate 2 transfers charges generated by the photoelectric converter 1 to the charge-voltage converter 5 in accordance with the transfer pulse PTX. In general, the charge-voltage converter 5 may be formed as a floating diffusion. The amount of charges transferred to the charge-voltage converter 5 determines its voltage. The charge-voltage converter 5 can be regarded as an element which converts the charge amount into a voltage. The amplifying transistor 4 amplifies the voltage of the charge-voltage converter 5, and outputs the amplified voltage to the pixel output line 130.

The reset transistor 3 resets the voltage of the charge-voltage converter 5 to a predetermined voltage. The source of the reset transistor 3 is connected to the charge-voltage converter 5 and the gate of the amplifying transistor 4. The drain of the reset transistor 3 is connected to the drain line VD together with that of the amplifying transistor 4.

In FIG. 11, the array of the pixel units 101 is simplified to 2 rows×2 columns for descriptive convenience. FIG. 11 does not illustrate an upper readout circuit in an exemplary photoelectric conversion device in which a lower readout circuit reads out signals from pixels in an odd-numbered column and an upper readout circuit reads out signals from pixels in an even-numbered column.

Figure 12:
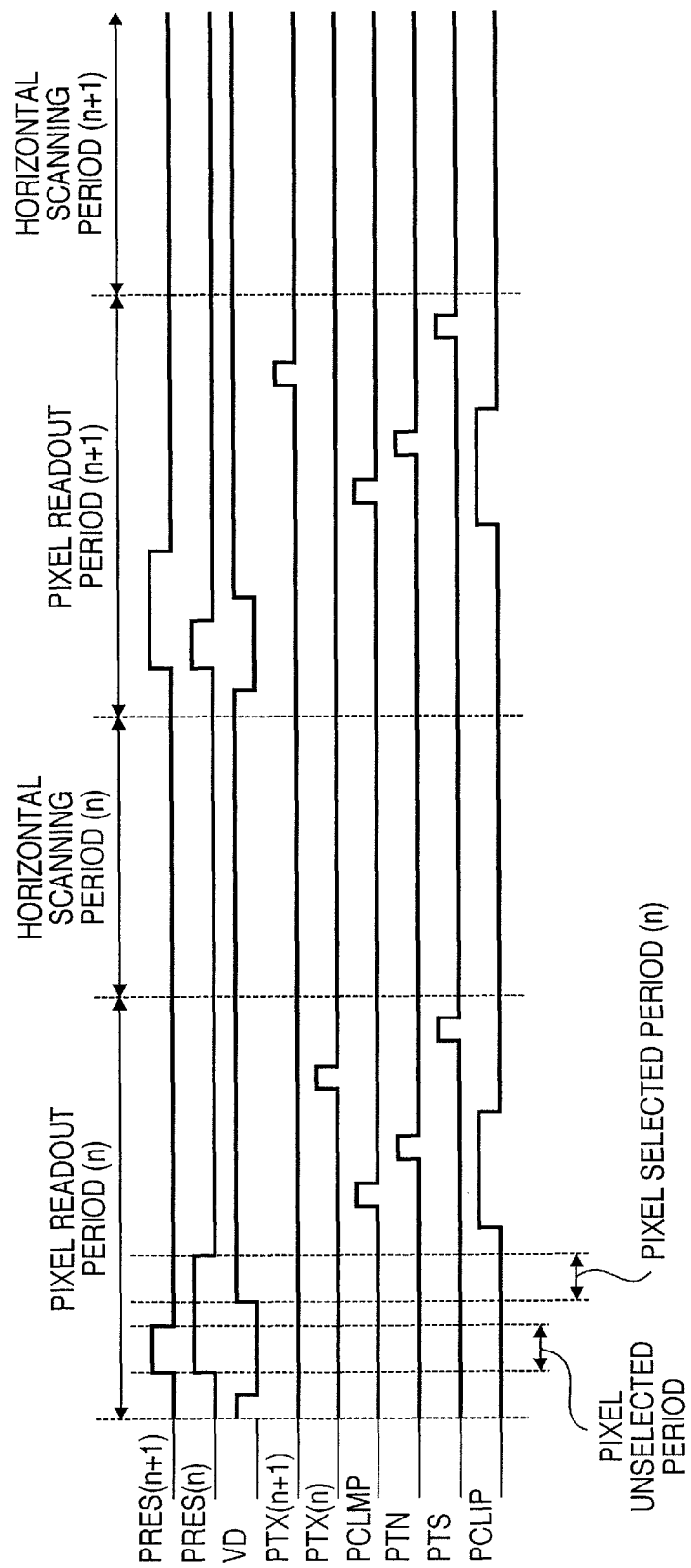
FIG. 12 is a timing chart showing the operation of the photoelectric conversion device shown in FIG. 11.

FIG. 12 is a timing chart showing the operation of the photoelectric conversion device 100. In the photoelectric conversion device 100 according to the embodiment, a target readout row is selected by controlling the gate voltage of the amplifying transistor 4. More specifically, a row is selected by decreasing the gate voltage of the amplifying transistor 4 on an unselected row so as to turn it off, and increasing the gate voltage of the amplifying transistor 4 on a selected row so as to turn it on. The pixel output line 130 functions as the output node of a source follower circuit formed from the amplifying transistor 4 and a constant-current load 7 on a selected row. The voltage of the pixel output line 130 complies with that of the charge-voltage converter 5 on a selected row. In the following description, "n" means the nth row of the photoelectric conversion device 100, and "n+1" means its (n+1)th row.

During the pixel unselected period in the pixel read period (n) for the nth row, a vertical scanning circuit 110 changes the reset signals PRES(0), . . . , PRES(n), PRES(n+1), . . . on all rows to the high level. Then, the charge-voltage converters 5 of all pixels are reset to the low level via the drain lines VD and the reset transistors 3. At this time, the drain lines VD are at the low level.

In the pixel selected period (n), reset signals on rows except for the selected row (nth row) change to the low level, and the drain line VD of the selected row (nth row) changes to the high level. The charge-voltage converter 5 on the selected row (nth row) is reset to the high level. After that, the reset signal PRES(n) of the selected row (nth row) also changes to the low level. At this time, an output (i.e., N output or noise level) corresponding to the pixel reset state is read out to the pixel output line 130.

An amplifying unit 120 amplifies a signal on the pixel output line 130. The amplifying unit 120 may include, for example, an operational amplifier (differential amplifier circuit) 10, an input capacitor (clamp capacitor) 8, a feedback capacitor 9, and a clamp control switch 11. In this arrangement, the ratio of the clamp capacitor 8 to the feedback capacitor 9 provides an inverting gain. While an N output corresponding to the pixel reset state is read out to the pixel output line 130, the clamp control pulse PCLMP changes to the high level to short-circuit the inverting input terminal and output terminal of the operational amplifier 10. As a result, the level at the output terminal of the operational amplifier 10 becomes almost equal to the voltage VREF. Thereafter, the clamp control pulse PCLMP changes to the low level, and an N output (noise level) corresponding to the pixel reset state appears at the output terminal of the operational amplifier 10. In this state, the transfer pulse PTN changes to the high level to store the N output corresponding to the pixel reset state in a capacitor 14 via a transfer switch (transfer transistor) 12 on the noise transfer path NT.

The transfer pulse PTX(n) on the nth row is activated to turn on the transfer gate 2 for a predetermined period, transferring charges from the photoelectric converter 1 to the charge-voltage converter 5. The amplifying transistor 4 on the nth row amplifies a voltage determined by charges transferred to the charge-voltage converter 5, and outputs the amplified voltage to the pixel output line 130. At this time, PCLMP is at the low level, so the operational amplifier 10 generates at its output terminal an S output (data level) by superposing, on an N output, a voltage component which gives an inverting gain with respect to the voltage change component of the pixel output line 130 generated by an optical signal.

Subsequently, the transfer pulse PTS changes to the high level, and an S output (data level) corresponding to an optical signal is stored in a capacitor 15 via a transfer switch (transfer transistor) 13 on the data transfer path ST. The horizontal transfer operation is performed in the horizontal scanning period (n) for the nth row. More specifically, while a horizontal scanning circuit 119 sequentially selects columns, an output unit 160 including a differential amplifier amplifies the difference between the data level and the noise level in a selected column, obtaining a pixel signal in the nth row. As is well known, the operation to obtain an optical response output based on the difference between the S output and the N output is called CDS (Correlated Double Sampling) operation. In this basic arrangement, a CDS circuit for the CDS operation includes the amplifying unit 120, the transfer switches 12 and 13, the capacitors 14 and 15, the output unit (differential amplifier) 160, and the like. A path 150 between the amplifying unit 120 and the output unit 160 including the differential amplifier which amplifies the difference between the data level and the noise level is a path for transferring the data level and noise level through a single or different lines. The path 150 will be called an SN transfer path. The SN transfer path 150 includes the data transfer path ST and noise transfer path NT.

While the vertical scanning circuit 110 scans selected rows, the above-described operation is repeated to obtain pixel signals from all pixels within the screen.

For example, the power supply voltage can be set to 3.3 V. The low level of the drain line VD can be set to 0.3 V to 1.0 V, and its high level can be set to 3.3 V.

The photoelectric conversion device 100 suppresses darkening (black spot) by restricting the N output level in storing an N output in the N output readout capacitor 14. More specifically, if very strong light enters the photoelectric conversion device in reading out an N output, charges flow into the floating diffusion. In response to this, the amplifying transistor drives the pixel output line to decrease the N output, causing darkening. To prevent this, when reading out an N output, the clipping transistor 6 restricts (clips) the voltage of the pixel output line 130 so as not to become lower than a specified value.

The source of the clipping transistor 6 is connected to the pixel output line 130. A predetermined voltage, for example, power supply voltage VDD is applied to the drain of the clipping transistor 6. The clip control voltage VCLIP is applied to the gate of the clipping transistor 6. When reading out an N output through the pixel output line 130, the clip control voltage VCLIP changes to the clip voltage VCLIPH. At this time, a voltage (clip voltage) determined by the clip voltage VCLIPH applied to the gate of the clipping transistor 6 defines the lower limit of the voltage of the pixel output line 130.

When reading out an S output through the pixel output line 130, the clip control voltage VCLIP changes to the non-clip voltage VCLIPL which does not turn on the clipping transistor 6.

[Operation Principle]

Figure 1:
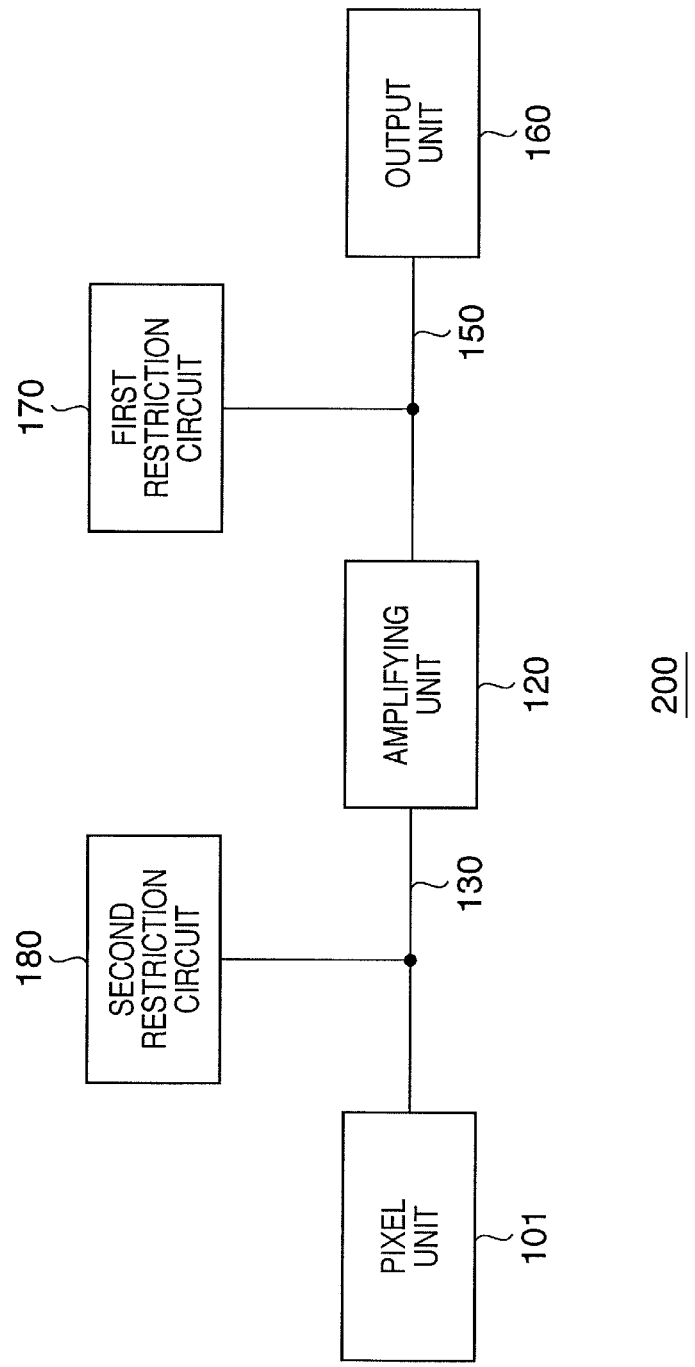
FIG. 1 is a block diagram for illustrating the operation principle of a photoelectric conversion device according to the present invention.

The operation principle of the photoelectric conversion device according to the present invention will be exemplarily described with reference to FIG. 1. A photoelectric conversion device 200 shown in FIG. 1 comprises the pixel unit 101, a pixel output line 130, an amplifying unit 120, an SN transfer path 150, and an output unit 160 as illustrated in FIG. 11. The amplifying unit 120 is arranged on the output side of the pixel unit 101, and the output unit 160 is arranged on the output side of the amplifying unit 120. Another circuit may be interposed between the pixel unit and the amplifying unit, and another circuit may be interposed between the amplifying unit and the output unit. The photoelectric conversion device 200 further comprises a first restriction circuit 170 and a second restriction circuit 180. The first restriction circuit 170 restricts a change of the voltage on the N transfer path on which the noise level may appear on the SN transfer path 150. The second restriction circuit 180 restricts a change of the voltage of a portion (e.g., charge-voltage converter) 5 where the noise level may appear in the pixel output line 130 or pixel unit 101.

The first restriction circuit 170 restricts (clips) the voltage of the N transfer path NT so as not to become lower than the first specified value owing to charges flowing into the charge-voltage converter 5 in reading out the noise level. The second restriction circuit 180 restricts (clips) the voltage of the pixel output line 130 so as not to become lower than the second specified value owing to charges flowing into the charge-voltage converter 5 in reading out the noise level.

The first restriction circuit 170 (in other words, the first specified value) is set to operate when the fluctuation width of the voltage of the charge-voltage converter 5 from the reset level is the first width in reading out the noise level. At this time, the second restriction circuit 180 (in other words, the second specified value) is preferably set to operate when the fluctuation width of the voltage of the charge-voltage converter 5 from the reset level is the second width larger than the first width in reading out the noise level.

The reason is as follows. The first restriction circuit 170 restricts a noise level (noise level to be provided to the amplifying unit) before amplified by the amplifying unit 120, whereas the second restriction circuit 180 restricts a noise level amplified by the amplifying unit 120. The influence of characteristic variations of the second restriction circuit 180 on an output image is smaller than that of characteristic variations of the first restriction circuit 170 on an output image. That is, the output image is less sensitive to characteristic variations of the second restriction circuit 180 than characteristic variations of the first restriction circuit 170. "Less sensitive" means that there is a wider design margin.

By setting the first restriction circuit 170 and the second restriction circuit 180 in the above-mentioned manner, the photoelectric conversion device 200 operates as follows. If light of a first brightness (intermediate brightness) enters a pixel in reading out the noise level, the first restriction circuit 170 operates to clip the noise level at the first specified value.

If light of a second brightness (high brightness) higher than the first brightness enters a pixel in reading out the noise level, the second restriction circuit 180 operates to clip the voltage of the pixel output line 130 at the second specified value. Hence, the voltage of the pixel output line 130 can change between readout of the noise level and readout of the data level. That is, a pixel signal of a proper level can be extracted from a pixel receiving light of the second brightness (high brightness). In the absence of the second restriction circuit 180, when light of the second brightness enters a pixel in reading out the noise level, the voltage of the pixel output line 130 may hardly change between reset of the amplifying unit 120, the readout of the noise level, and the readout of the data level. This leads to a small output from the amplifying unit 120. As a result, the first restriction circuit 170 fails to operate though light of the second brightness (high brightness) enters a pixel. As a result, a data level hardly different from that in reset of the amplifying unit 120 is output.

First Embodiment

Figure 3:
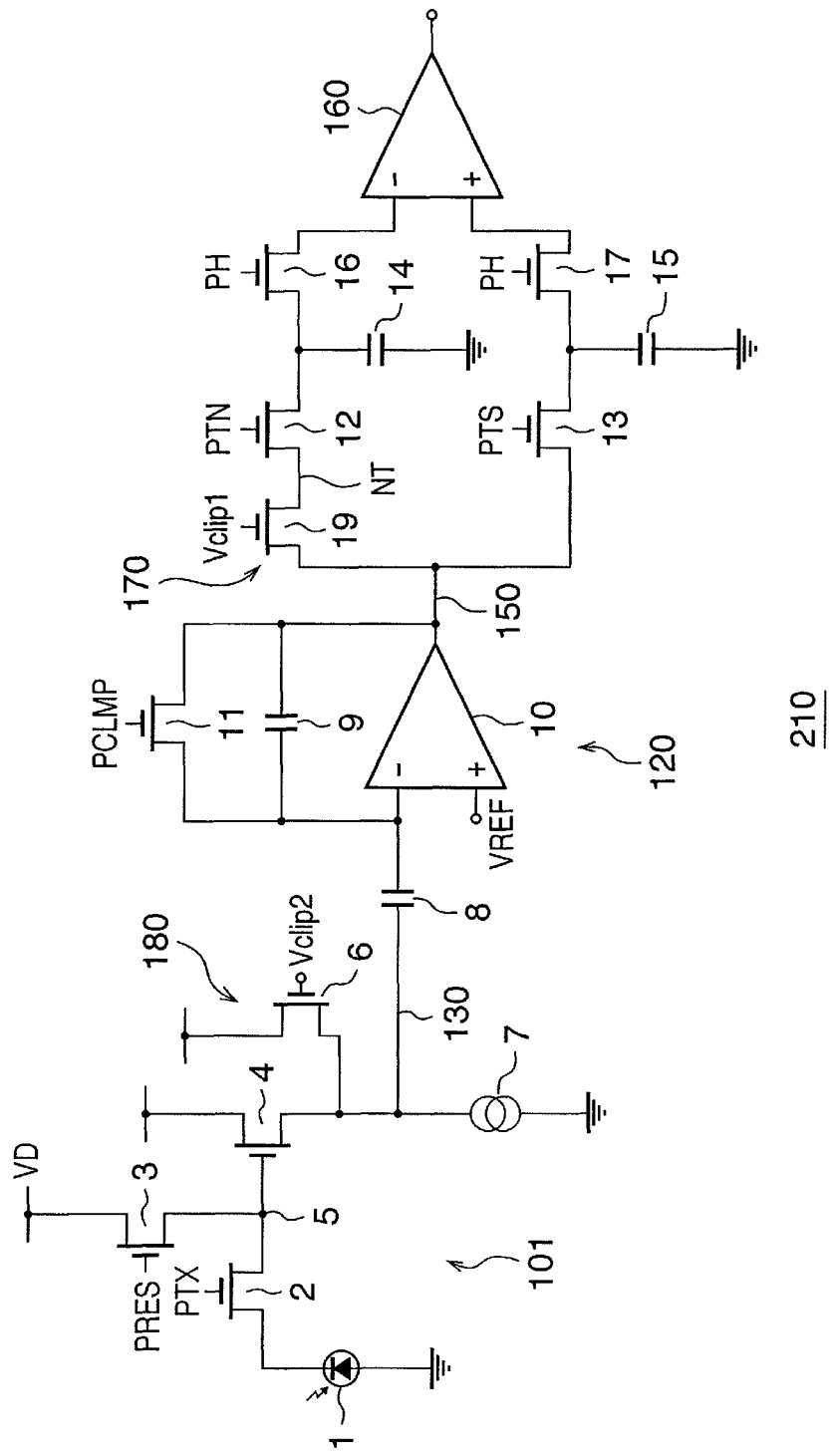
FIG. 3 is a circuit diagram showing the schematic arrangement of a photoelectric conversion device according to the first embodiment of the present invention.

FIG. 3 is a circuit diagram showing the schematic arrangement of a photoelectric conversion device according to the first embodiment of the present invention. A photoelectric conversion device 210 shown in FIG. 3 is simplified, and its basic arrangement is the same as that of a photoelectric conversion device 100 shown in FIG. 11. A first clipping transistor 19 is an example of a first restriction circuit 170, and a second clipping transistor 6 is an example of a second restriction circuit 180.

Figure 4:
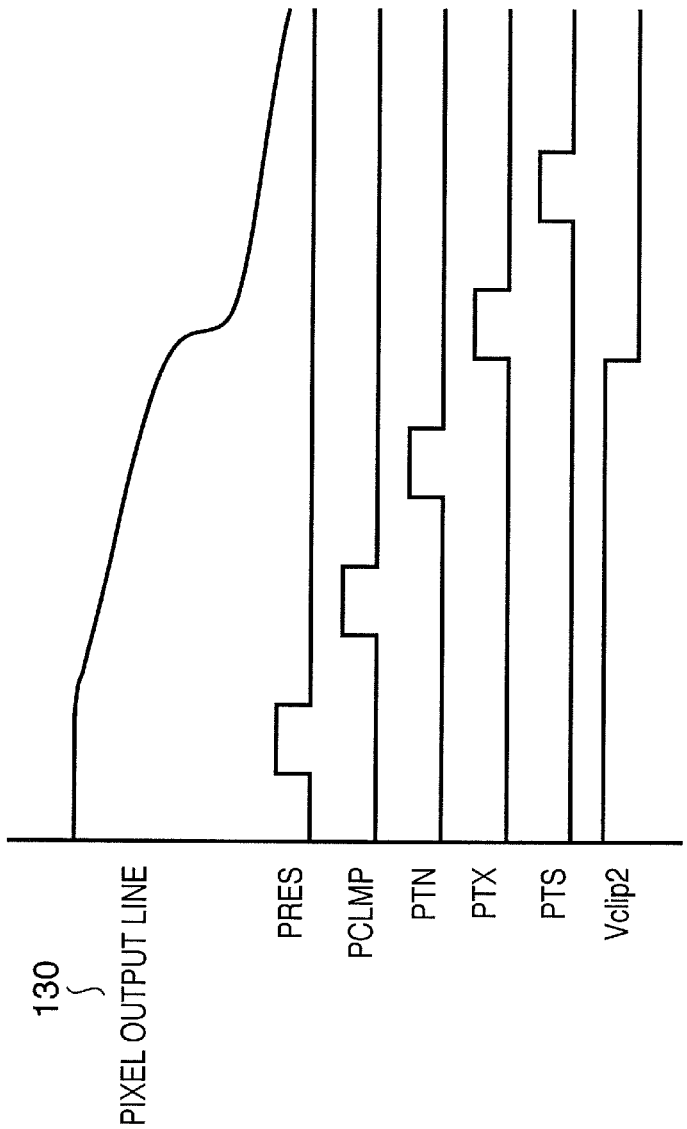
FIG. 4 is a timing chart showing an example of a voltage change of a pixel output line when light of the first brightness (intermediate brightness) enters a pixel.
Figure 5:
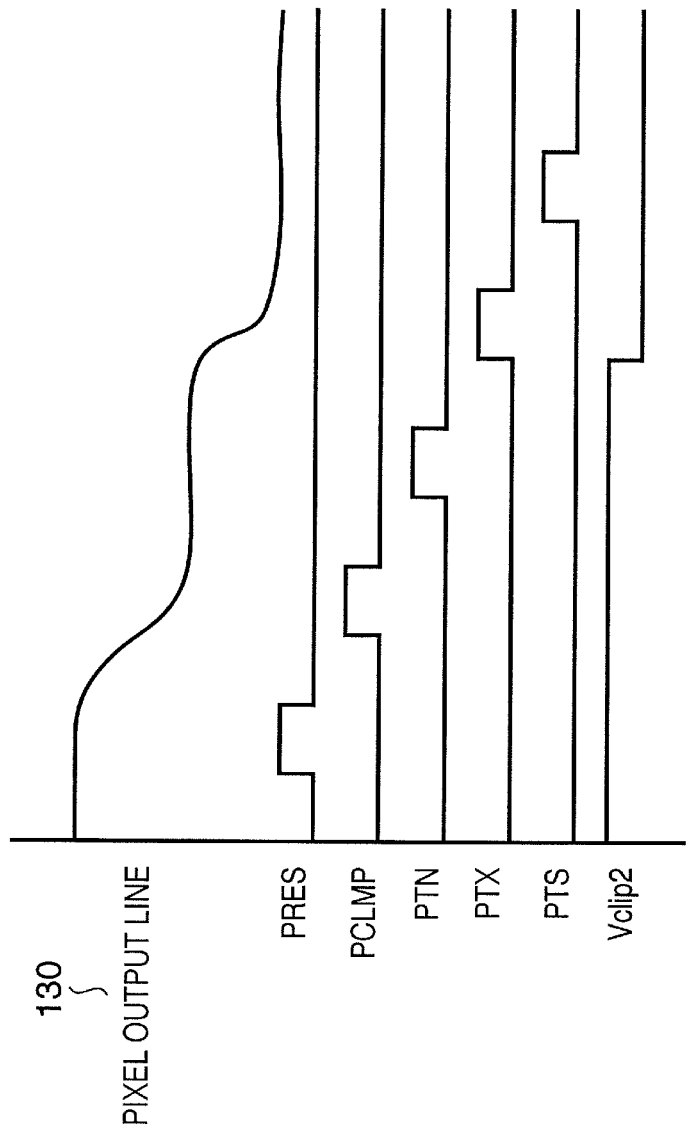
FIG. 5 is a timing chart showing an example of a voltage change of the pixel output line when light of the second brightness (high brightness) enters a pixel.

FIG. 4 is a timing chart showing an example of a voltage change of the pixel output line when light of the first brightness (intermediate brightness) enters a pixel. FIG. 5 is a timing chart showing an example of a voltage change of the pixel output line when light of the second brightness (high brightness) enters a pixel. The operation of the photoelectric conversion device 210 shown in FIG. 3 will be explained with reference to FIGS. 4 and 5. Only the operation of a target readout row will be explained below.

A normal operation which does not affect the noise level of light entering a pixel will be described first. The reset signal PRES is activated to the high level to turn on a reset transistor 3 and reset a charge-voltage converter 5 to a predetermined voltage. While an amplifying transistor 4 outputs the noise level to a pixel output line 130, the clamp control pulse PCLMP changes to the high level to short-circuit the inverting input terminal and output terminal of an operational amplifier 10. The level at the output terminal of the operational amplifier 10 becomes almost equal to the voltage VREF. Then, the clamp control pulse PCLMP changes to the low level, and an N output (noise level) corresponding to the pixel reset state appears at the output terminal of the operational amplifier 10. In this state, the transfer pulse PTN changes to the high level to store the N output corresponding to the pixel reset state in a capacitor 14 via the first clipping transistor 19 and the transfer switch 12 which are inserted in the N transfer path NT.

The transfer pulse PTX is activated to turn on the transfer gate 2 for a predetermined period, transferring charges from the photoelectric converter 1 to the charge-voltage converter 5. The amplifying transistor 4 amplifies transferred charges based on the voltage of the charge-voltage converter 5, and outputs the amplified charges to the pixel output line 130. At this time, the voltage of the pixel output line 130 drops in accordance with the charge amount transferred to the charge-voltage converter 5.

Since PCLMP is at low level, the operational amplifier 10 generates at its output terminal a data level by superposing, on the noise level, a voltage component which gives an inverting gain with respect to the voltage change component of the pixel output line 130 generated by an optical signal.

Subsequently, the transfer pulse PTS changes to the high level, and the capacitor 15 holds a data level corresponding to an optical signal via the transfer switch (transfer transistor) 13.

A horizontal scanning circuit turns on transfer switches 16 and 17. An output unit 160 including a differential amplifier differentially amplifies the noise level and the data level held by the capacitors 14 and 15, and outputs the amplified levels.

An operation when light of the first brightness (intermediate brightness) enters a pixel will be explained with reference to FIG. 4. The first brightness is just bright enough to only change the voltage of the charge-voltage converter 5 due to charges which are generated in the photoelectric converter 1 or the like and flow into the charge-voltage converter 5 in reading out the noise level.

As illustrated in FIG. 4, the voltage of the pixel output line 130 gradually drops owing to charges flowing into the charge-voltage converter 5. The voltage of the pixel output line 130 changes before the clamp control pulse PCLMP changes to the low level to turn off a clamp control switch 11 and turn off the transfer switch 12. In the absence of the first clipping transistor 19, the capacitor 14 may hold a voltage higher than an original reset level. For this reason, when the output unit 160 including the differential amplifier amplifies the difference between the data level and the noise level, a portion receiving strong light becomes darker than the surroundings.

This phenomenon (darkening) can be suppressed by inserting the first clipping transistor 19 in the N transfer path NT. The maximum value of a voltage applied to the output side (transfer switch 12) of the first clipping transistor 19 is a voltage obtained by subtracting a threshold from the gate voltage Vclip1 of the clipping transistor 19. That is, the first clipping transistor 19 restricts (clips) a voltage held by the capacitor 14 to a voltage obtained by subtracting a threshold from the gate voltage Vclip1 of the clipping transistor 19.

An operation when light of the second brightness (high brightness) higher than the first brightness enters a pixel will be explained with reference to FIG. 5.

After the reset signal PRES changes to the low level to turn off the reset transistor 3, the voltage of the pixel output line 130 drops with an inclination larger than that in FIG. 4. When the voltage of the pixel output line 130 drops to a given voltage, the second clipping transistor 6 is turned on to clip the voltage of the pixel output line 130. No output from the amplifying transistor 4 changes until the transfer switch 12 is turned off after the clamp control pulse PCLMP changes to the low level to turn off the clamp control switch 11. This can prevent writing of a high-level voltage in the capacitor 14.

Simultaneously when the transfer pulse PTX is activated, the gate voltage Vclip2 of the second clipping transistor is set to a low voltage. While the transfer pulse PTS is activated to turn on the transfer switch 13, the voltage of the pixel output line 130 drops, and the capacitor 15 holds a data level in accordance with the voltage change.

A case where no second clipping transistor 6 exists will be examined In this case, if light of the second brightness enters a pixel in reading out the noise level, the voltage of the pixel output line 130 may hardly change between the reset of the amplifying unit 120, the readout of the noise level, and the readout of the data level. An output from the amplifying unit 120 is at almost the VREF level in all of the reset, the readout of the noise level, and the readout of the data level. In this case, neither the first clipping transistor 19 clips the voltage of the N transfer path NT, nor the capacitor 15 holds an effective data level.

As described above, the photoelectric conversion device according to the first embodiment comprises the first restriction circuit 170 which suppresses darkening caused by incident light of the first brightness, and the second restriction circuit 180 which suppresses darkening caused by incident light of the second brightness higher than the first brightness.

The first restriction circuit 170 is arranged on the output side of the amplifying unit 120, and the second restriction circuit 180 is arranged on the input side of the amplifying unit 120. This arrangement can suppress degradation of the image quality caused by characteristic variations of the restriction circuits while suppressing darkening.

Second Embodiment

Figure 6:
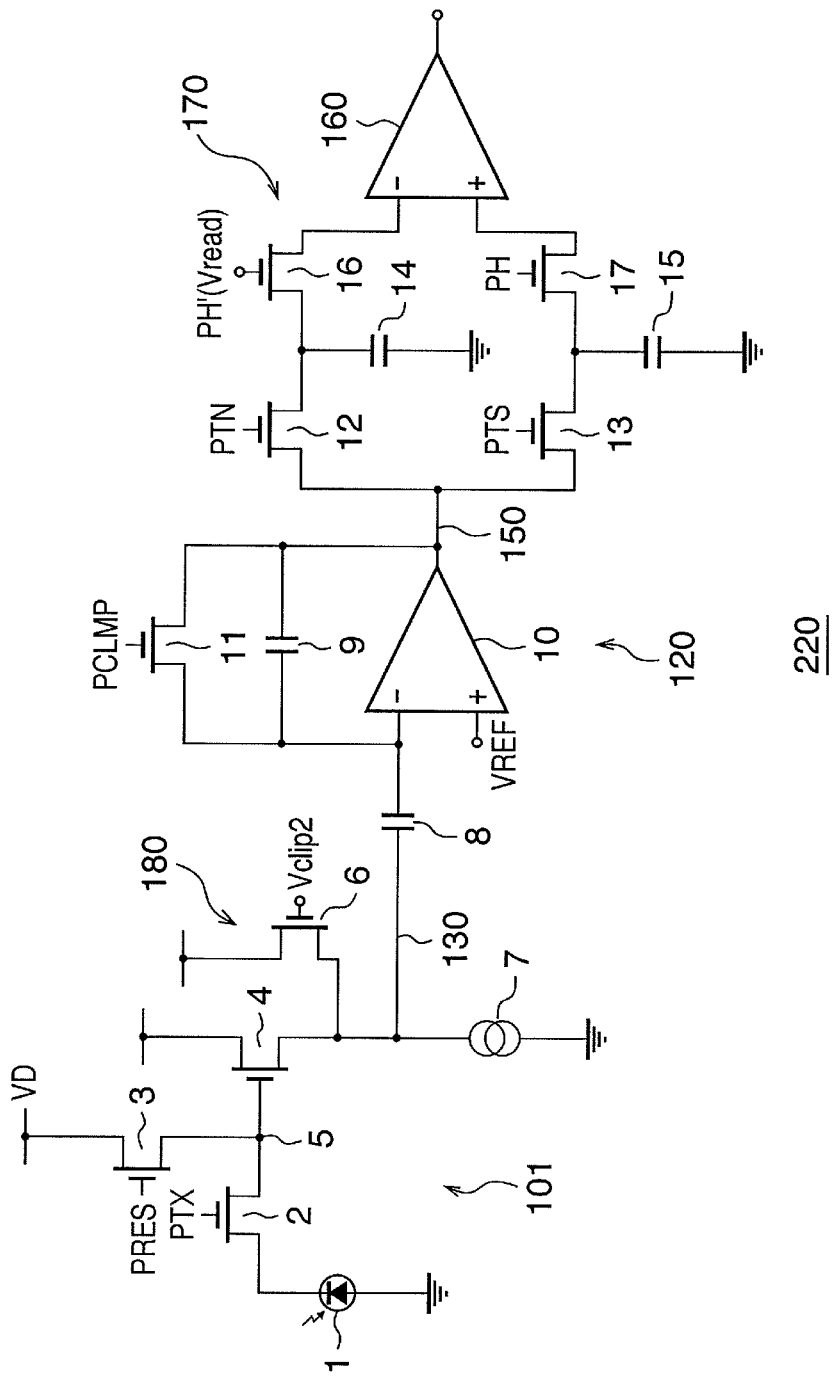
FIG. 6 is a circuit diagram showing the schematic arrangement of a photoelectric conversion device according to the second embodiment of the present invention.

FIG. 6 is a circuit diagram showing the schematic arrangement of a photoelectric conversion device according to the second embodiment of the present invention. A photoelectric conversion device 220 shown in FIG. 6 is simplified, and its basic arrangement is the same as that of a photoelectric conversion device 100 shown in FIG. 11. A transfer switch 16 functions as a first restriction circuit 170, and is controlled by the transfer pulse PH' having the same logical level as the transfer pulse PH but with the voltage level Vread different from the transfer pulse PH. A second clipping transistor 6 is an example of a second restriction circuit 180.

In the second embodiment, a noise level held by a capacitor 14 is clipped at a predetermined clip level (Vread−threshold) when provided to an output unit 160 including a differential amplifier via the transfer switch 16 functioning as the first restriction circuit 170. The second clipping transistor 6 has been described in the first embodiment.

As described above, the photoelectric conversion device according to the second embodiment comprises the first restriction circuit 170, which suppresses darkening caused by incident light of the first brightness, and the second restriction circuit 180, which suppresses darkening caused by incident light of the second brightness higher than the first brightness. The first restriction circuit 170 is arranged on the output side of an amplifying unit 120, and the second restriction circuit 180 is arranged on the input side of the amplifying unit 120. This arrangement can suppress degradation of the image quality caused by characteristic variations of the restriction circuits while suppressing darkening.

Third Embodiment

Figure 7:
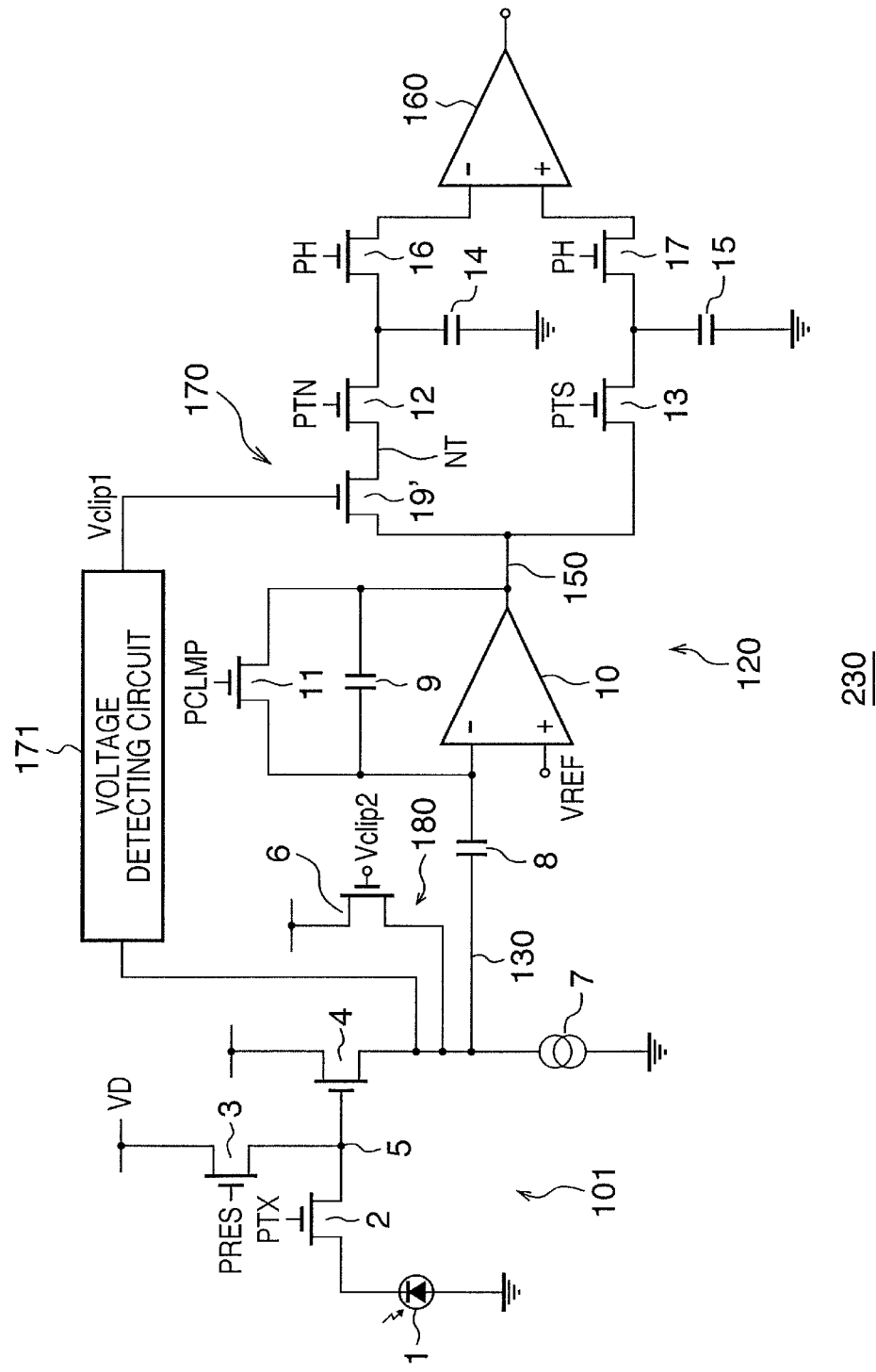
FIG. 7 is a circuit diagram showing the schematic arrangement of a photoelectric conversion device according to the third embodiment of the present invention.

FIG. 7 is a circuit diagram showing the schematic arrangement of a photoelectric conversion device according to the third embodiment of the present invention. A photoelectric conversion device 230 shown in FIG. 7 is simplified, and its basic arrangement is the same as that of a photoelectric conversion device 100 shown in FIG. 11. A transistor 19' and a voltage detecting circuit 171 which controls it are an example of a first restriction circuit 170. A second clipping transistor 6 is an example of a second restriction circuit 180.

When the fluctuation width on a pixel output line 130 from the reset level falls within a specified width, the voltage detecting circuit 171 applies the voltage Vclip1 to the gate of the transistor 19', similar to the first embodiment. If the fluctuation width on the pixel output line 130 from the reset level exceeds the specified width, the voltage detecting circuit 171 applies 0 V to the gate of the transistor 19'. As a result, the voltage of the capacitor 14 is kept unchanged at an initial low voltage, suppressing darkening.

The second clipping transistor 6 has been described in the first embodiment.

As described above, the photoelectric conversion device according to the third embodiment comprises the first restriction circuit 170, which suppresses darkening caused by incident light of the first brightness, and the second restriction circuit 180, which suppresses darkening caused by incident light of the second brightness higher than the first brightness.

The first restriction circuit 170 is arranged on the output side of an amplifying unit 120, and the second restriction circuit 180 is arranged on the input side of the amplifying unit 120. This arrangement can suppress degradation of the image quality caused by characteristic variations of the restriction circuits while suppressing darkening.

Fourth Embodiment

Figure 8:
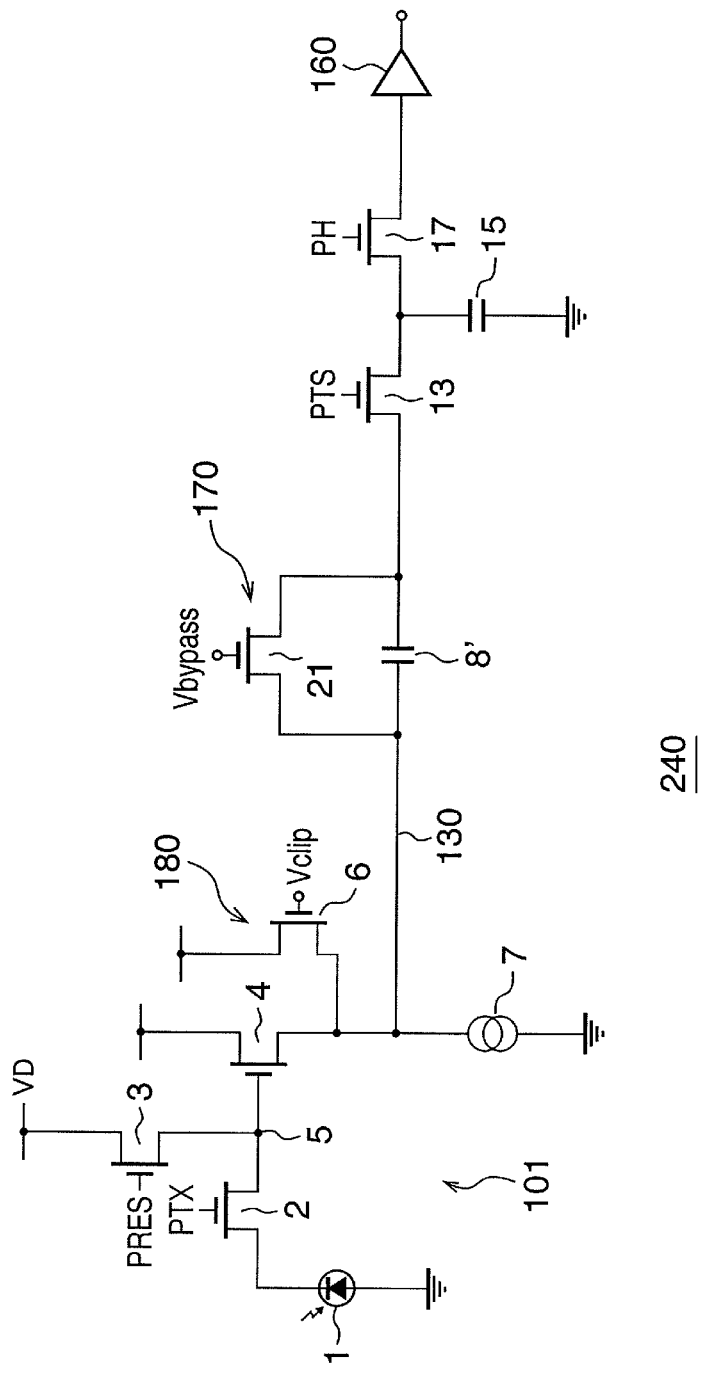
FIG. 8 is a circuit diagram showing the schematic arrangement of a photoelectric conversion device according to the fourth embodiment of the present invention.

FIG. 8 is a circuit diagram showing the schematic arrangement of a photoelectric conversion device according to the fourth embodiment of the present invention. A bypass transistor 21 is an example of the first restriction circuit 170, and a second clipping transistor 6 is an example of the second restriction circuit 180.

The second clipping transistor 6 serving as the second restriction circuit 180 has been described in the first embodiment. The bypass transistor 21 serving as the first restriction circuit 170 is so arranged as to bypass a clamp capacitor 8'. The bypass transistor 21 is turned on when the voltage of a pixel output line 130 drops to a voltage lower than one obtained by subtracting a threshold from the gate voltage Vbypass. Then, the bypass transistor 21 bypasses the clamp capacitor 8' to write the voltage of the pixel output line 130 in a capacitor 15.

A voltage corresponding to the data level is written in the capacitor 15 regardless of noise level variations on the pixel output line 130, preventing darkening.

In this manner, the bypass transistor 21 and the clipping transistor 6 can operate complementarily to implement a readout circuit with a voltage margin sufficient to effectively prevent the darkening phenomenon without affecting a normal signal.

Fifth Embodiment

Figure 9:
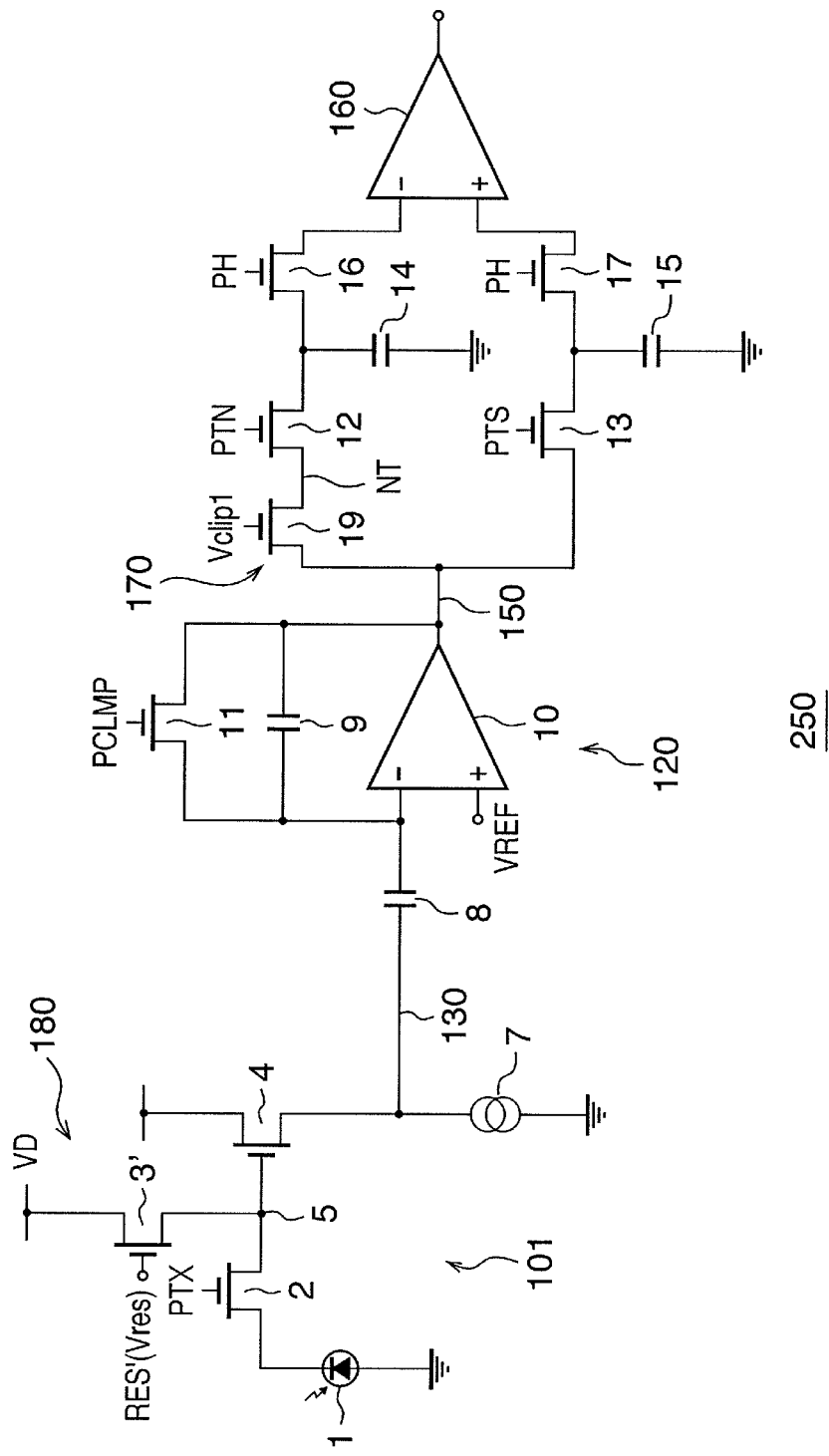
FIG. 9 is a circuit diagram showing the schematic arrangement of a photoelectric conversion device according to the fifth embodiment of the present invention.

FIG. 9 is a circuit diagram showing the schematic arrangement of a photoelectric conversion device according to the fifth embodiment of the present invention. A photoelectric conversion device 250 shown in FIG. 9 is simplified, and its basic arrangement is the same as that of a photoelectric conversion device 100 shown in FIG. 11. A first clipping transistor 19 is an example of the first restriction circuit 170. A reset transistor 3' in a pixel unit 101 functions as the second restriction circuit 180, and is controlled by the reset signal RES' having the same logical level as the above-described reset signal RES but the voltage level changed to the clip voltage Vres.

The reset transistor 3' serving as the second restriction circuit 180 restricts (clips) the voltage of the charge-voltage converter 5 so that the voltage of the charge-voltage converter 5 does not become lower than a voltage (Vres−threshold). That is, the reset transistor 3' prevents the voltage of the charge-voltage converter 5 from being lower than the voltage (Vres−threshold) due to charges flowing into the charge-voltage converter 5 when strong light enters a pixel.

As described above, the photoelectric conversion device according to the fifth embodiment comprises the first restriction circuit 170 which suppresses darkening caused by incident light of the first brightness, and the second restriction circuit 180 which suppresses darkening caused by incident light of the second brightness higher than the first brightness. The first restriction circuit 170 is arranged on the output side of an amplifying unit 120, and the second restriction circuit 180 is arranged on the input side of the amplifying unit 120. This arrangement can suppress degradation of the image quality caused by characteristic variations of the restriction circuits while suppressing darkening.

Sixth Embodiment

Figure 10:
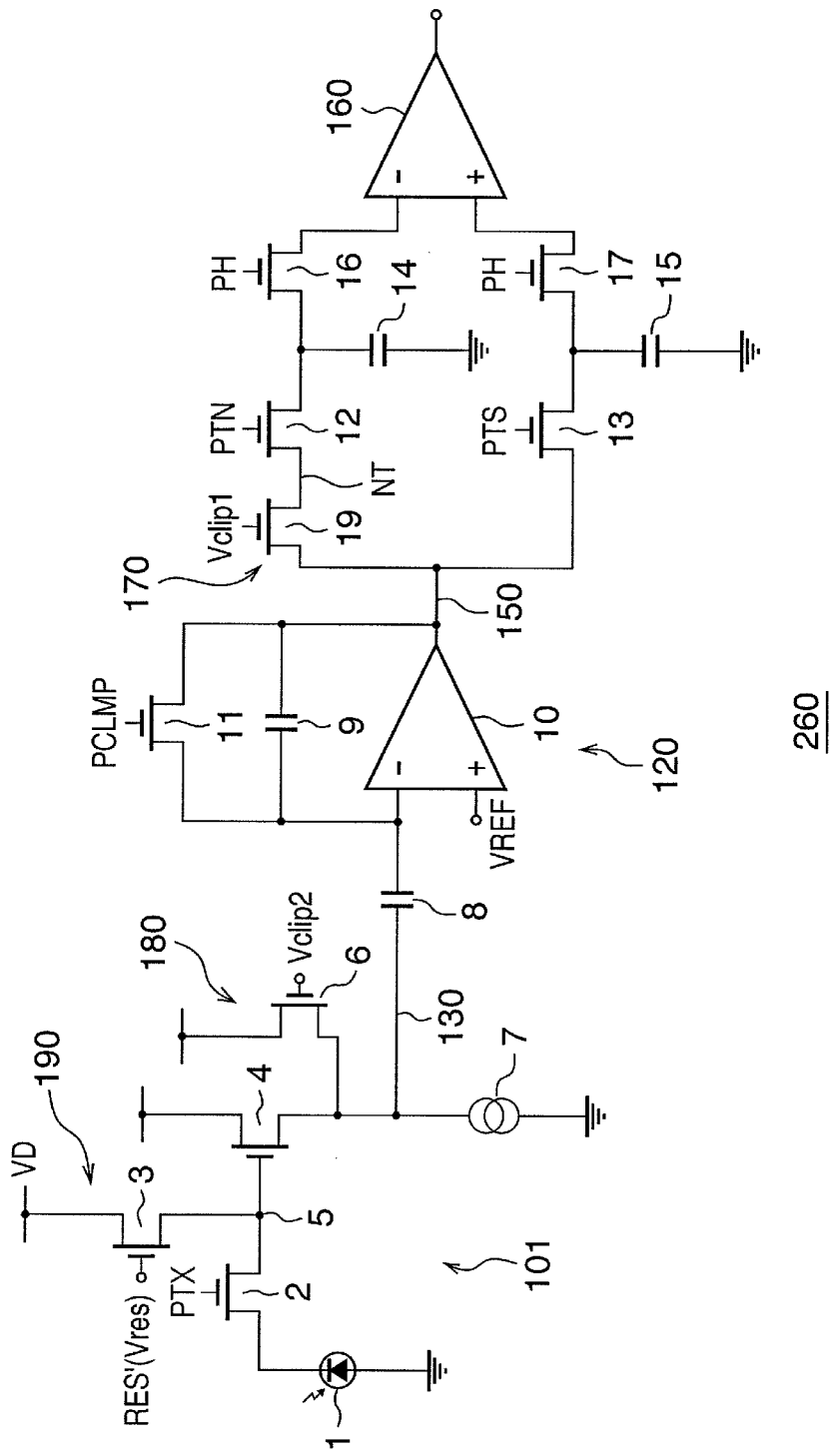
FIG. 10 is a circuit diagram showing the schematic arrangement of a photoelectric conversion device according to the sixth embodiment of the present invention.

FIG. 10 is a circuit diagram showing the schematic arrangement of a photoelectric conversion device according to the sixth embodiment of the present invention. A photoelectric conversion device 260 shown in FIG. 10 is simplified, and its basic arrangement is the same as that of the photoelectric conversion device 100 shown in FIG. 11. The first clipping transistor 19 is an example of the first restriction circuit 170, and the second clipping transistor 6 is an example of the second restriction circuit 180. The reset transistor 3' in the pixel unit 101 functions as described in the fifth embodiment, and serves as a third restriction circuit 190.

Application Example

Figure 13:
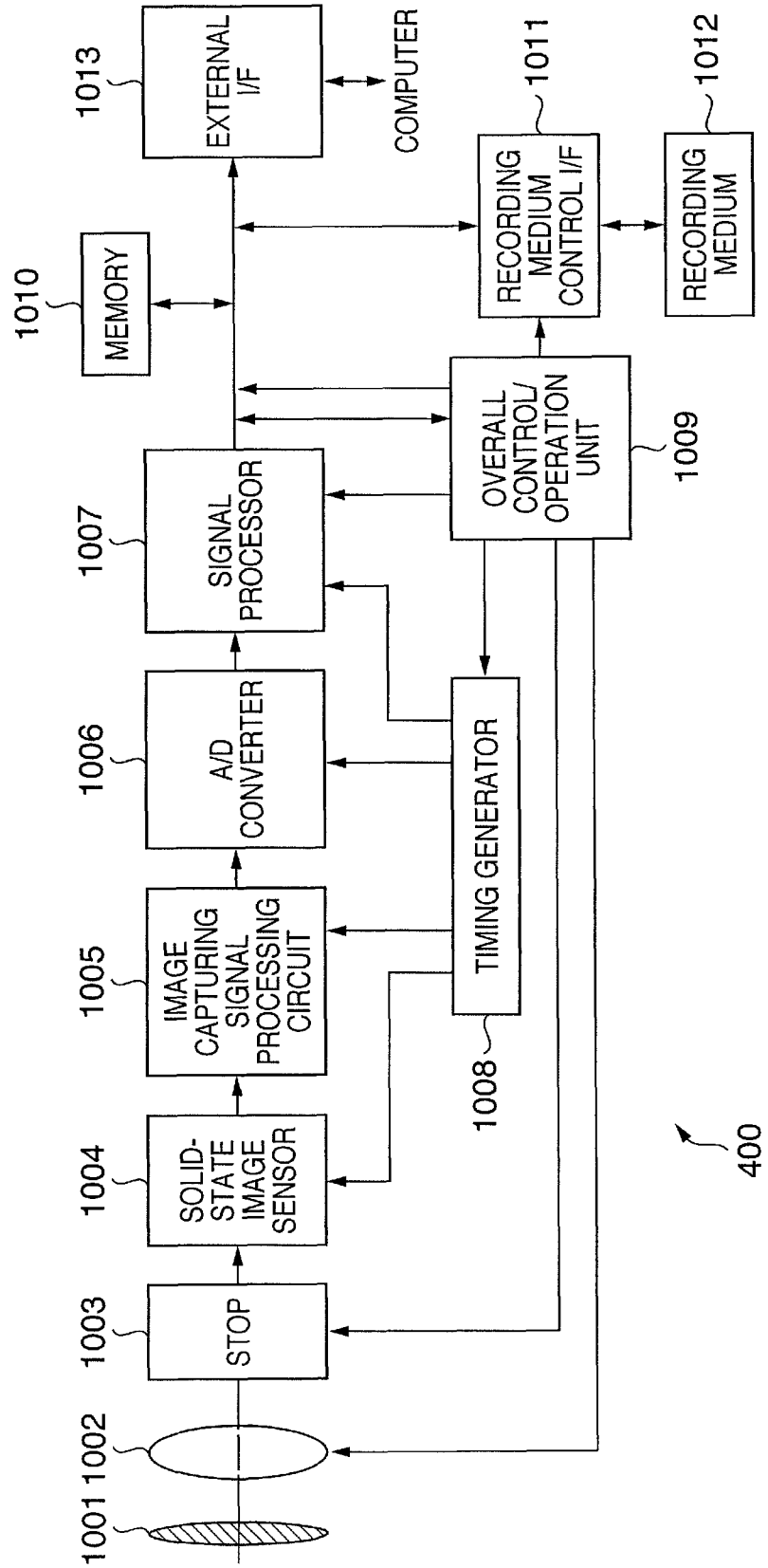
FIG. 13 is a block diagram showing the schematic arrangement of an image capturing device according to a preferred embodiment of the present invention.

FIG. 13 is a block diagram showing the schematic arrangement of an image capturing device according to a preferred embodiment of the present invention. An image capturing device 400 comprises a solid-state image sensor 1004 typified by each of the photoelectric conversion devices according to the first to sixth embodiments.

A lens 1002 forms an optical image of an object on the image capturing plane of the solid-state image sensor 1004. The outer surface of the lens 1002 is covered with a barrier 1001, which protects the lens 1002 and also serves as a main switch. The lens 1002 has a stop 1003 to adjust the quantity of light passing through the lens 1002. An image capturing signal processing circuit 1005 performs various processes such as correction and clamping for image capturing signals output from the solid-state image sensor 1004 through a plurality of channels. An A/D converter 1006 analog-to-digital converts image capturing signals output from the image capturing signal processing circuit 1005 through a plurality of channels. A signal processor 1007 performs various processes such as correction and data compression for image data output from the A/D converter 1006. The solid-state image sensor 1004, the image capturing signal processing circuit 1005, the A/D converter 1006, and the signal processor 1007 operate in accordance with timing signals generated by a timing generator 1008.

The blocks 1005 to 1008 may be formed on the same chip as that of the solid-state image sensor 1004. An overall control/operation unit 1009 controls the blocks of the image capturing device 400. The image capturing device 400 comprises a memory 1010 for temporarily storing image data, and a recording medium control interface 1011 for recording/reading out an image on/from a recording medium. A recording medium 1012 includes a semiconductor memory and the like and is detachable. The image capturing device 400 may comprise an external interface (I/F) 1013 for communicating with an external computer or the like.

The operation of the image capturing device 400 shown in FIG. 13 will be described. In response to opening of the barrier 1001, the main power supply, the power supply of the control system, and the power supply of the image capturing circuit including the A/D converter 1006 are sequentially turned on. To control the exposure, the overall control/operation unit 1009 sets the stop 1003 to the full-aperture state. A signal output from the solid-state image sensor 1004 enters the A/D converter 1006 through the image capturing signal processing circuit 1005. The A/D converter 1006 A/D-converts the signal and outputs it to the signal processor 1007. The signal processor 1007 processes the data and supplies it to the overall control/operation unit 1009. The overall control/operation unit 1009 calculates and determines the exposure. The overall control/operation unit 1009 controls the stop based on the determined exposure.

The overall control/operation unit 1009 extracts a high-frequency component from the signal, which is output from the solid-state image sensor 1004 and processed by the signal processor 1007, and calculates the distance to the object based on the high-frequency component. The overall control/operation unit 1009 drives the lens 1002 to determine whether the object is in focus. If the overall control/operation unit 1009 determines that the object is out of focus, it drives the lens 1002 again to measure the distance.

After confirming that the object is in focus, actual exposure starts. After the end of exposure, an image capturing signal output from the solid-state image sensor 1004 undergoes correction and the like by the image capturing signal processing circuit 1005, is A/D-converted by the A/D converter 1006, and is processed by the signal processor 1007. The image data processed by the signal processor 1007 is stored in the memory 1010 by the overall control/operation unit 1009.

The image data stored in the memory 1010 is recorded on the recording medium 1012 via the recording medium control I/F under the control of the overall control/operation unit 1009. The image data can be provided to a computer or the like via the external I/F 1013 and processed by it.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-216220 filed Aug. 8, 2006, which is hereby incorporated by reference herein in its entirety.

What is claimed is:

1. A photoelectric conversion device comprising:
a pixel unit configured to output, to a first output line, a noise level, and a signal generated by photoelectric conversion of an optical signal;
an output unit;
a clamp circuit having an input terminal connected to the first output line and an output terminal connected to a second output line, wherein the output unit is configured to output a signal in accordance with a signal provided via the second output line;
a bypass transistor having an input terminal connected to the first output line and an output terminal connected to the second output line, so as to bypass the clamp circuit when the noise level is output to the first output line, wherein the bypass transistor includes a gate to which a predetermined voltage is applied; and
a clip transistor arranged to clip a voltage of the first output line when the noise level is output to the first output line.

2. The device according to claim 1, wherein the clamp circuit is a noise reduction circuit.

3. The device according to claim 1, wherein the clamp circuit is a correlated double sampling circuit.

4. The device according to claim 1, wherein the output unit includes a capacitor configured to hold a signal supplied via the first output line.

5. The device according to claim 1, wherein the clamp circuit includes a capacitor arranged, in series, between the first output line and the output unit.

6. The device according to claim 1, wherein the pixel unit includes a photoelectric converter, a charge-voltage converter, a transfer gate that transfers charges from the photoelectric converter to the charge-voltage converter, and an amplifying transistor that outputs to the first output line a signal in accordance with a voltage of the charge-voltage converter.

7. The device according to claim 1, wherein the bypass transistor bypasses the clamp circuit when an amount of change in the voltage of the first output line from a reset level is a first amount, and the clip transistor clips the voltage of the first output line when the amount of change in the voltage of the first output line from the reset level is a second amount that is larger than the first amount.

* * * * *